(No Model.)

B. J. CURRY.
Cotton Chopper and Scraper.

No. 238,028. Patented Feb. 22, 1881.

Attest:
F. H. Schott
M. Willoughby

Inventor:
B. J. Curry
By Thos. C. Fullerton
Atty.

UNITED STATES PATENT OFFICE.

BURWELL J. CURRY, OF HUNTSVILLE, ALABAMA.

COTTON CHOPPER AND SCRAPER.

SPECIFICATION forming part of Letters Patent No. 238,028, dated February 22, 1881.

Application filed January 5, 1881. (No model.)

*To all whom it may concern:*

Be it known that I, BURWELL J. CURRY, a citizen of the United States, residing at Huntsville, in the county of Madison and State of Alabama, have invented certain new and useful Improvements in Cotton Choppers and Scrapers; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to that class of farm implements commonly known as "cotton-choppers," and its object is to save hand-labor in thinning out cotton, pease, beans, sorghum, and other plants grown in furrows. It is propelled by horse-power, and in operation it is run crosswise of the furrow or row of plants.

Figure 1:
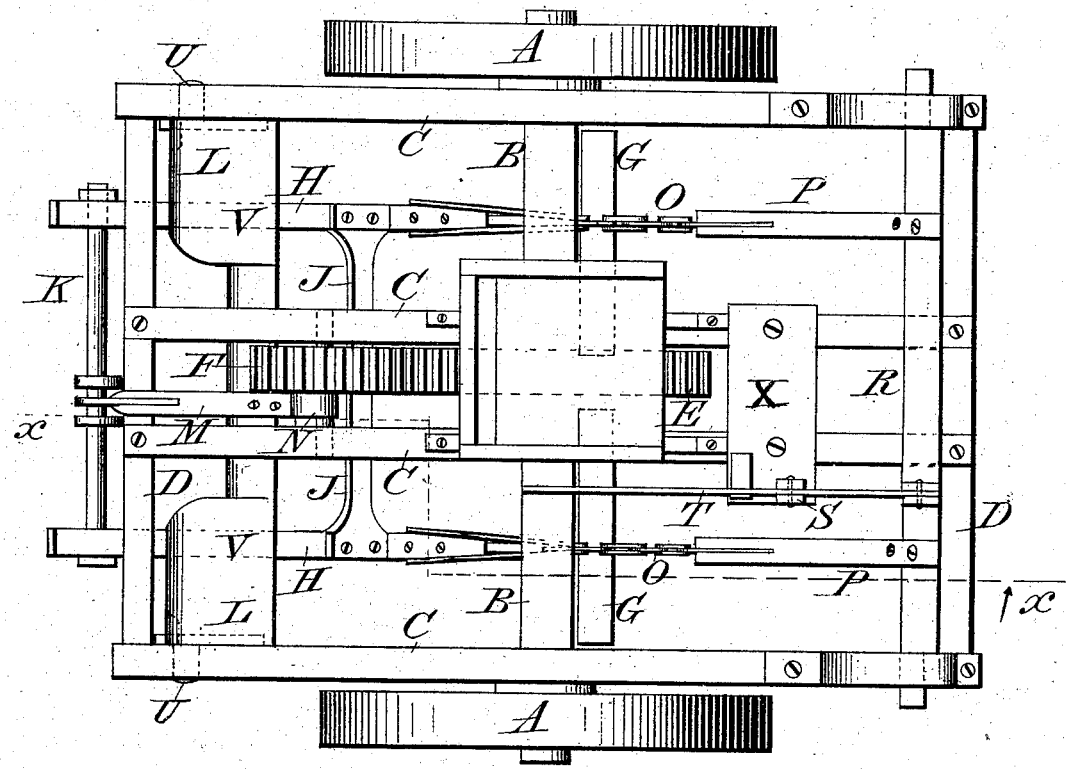
Figure 2:
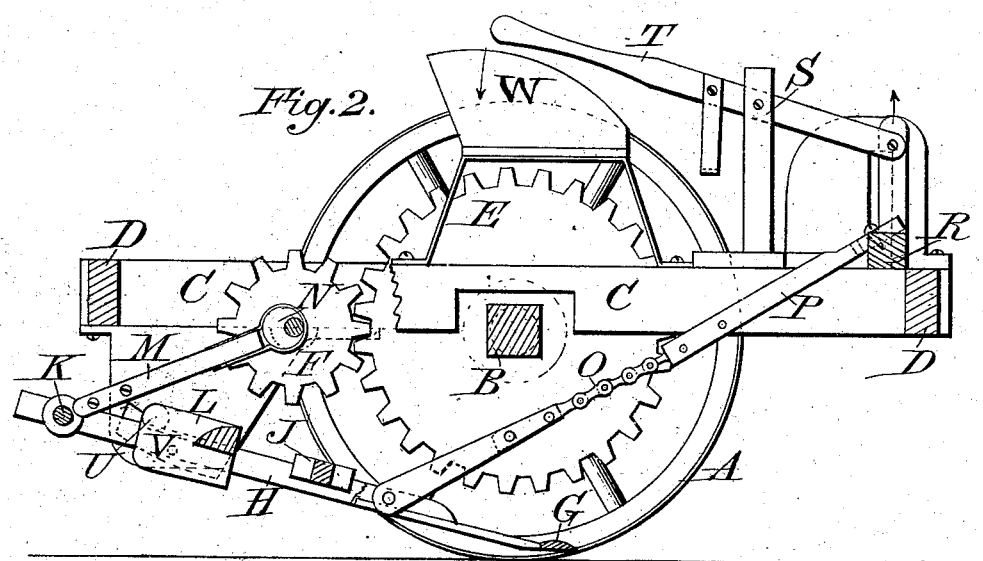

In the accompanying drawings, Figure 1 represents a top elevation of my invention, and Fig. 2 a sectional view at line $xx$ in Fig. 1.

Similar letters of reference indicate corresponding parts.

A A are carriage-wheels of ordinary form, and made of wood.

B is the axle, upon which the wheels A are mounted, one of which is rigidly fixed to said axle, thereby communicating motion through the cog-wheels to the operating parts of the machine.

C C C C are parallel beams riding centrally upon the axle B at right angles, to form a frame and base upon which to mount the operating parts.

D D are cross-beams and part of said frame.

E represents the driving-wheel rigidly fixed to the axle B, to engage and actuate the pinion F and eccentric-wheel N.

G G are blades of polished steel, with iron helves adjusted perpendicular to their edge, and slightly concaved to permit them to operate horizontally. These blades G are to be of varying lengths, and attached to stocks H H with bolts and nuts, so that by exchanging the thinning and spacing of the plants may be regulated. The position of the blades in motion is directly under the axle B, thus securing effective work in passing over an undulating surface. Stocks H H, to which blades G are fixed, are firmly connected and operated as a unit by cross-bar J and shaft or rod K, and are guided and kept in place by cross-beam L, which beam is suspended under beams C, and having bearings at points U. Stocks H have suitable bearings attached to cross-beam L at point V.

M represents a pitman-rod connecting with iron rod K, and actuated by an eccentric-wheel, N, attached to pinion F, thus giving to blades G a rapid movement to and fro, that prevents their clogging and effectually cuts the plants to be removed. The stocks H and blades G are stayed by chains O O, which are connected with arms P P, which, in turn, are rigidly fixed to cross-bar R.

S represents a fulcrum; T, a lever connecting with cross-bar R, by lifting which the blades G are elevated and placed free of obstructions in moving the machine from place to place. The bearings of cross-beam L at point U permit the blades G and stock H to be elevated to any desired height.

W represents the driver's seat, and X the foot-board.

From the above description of the various parts of my invention and their several functions it is obvious that their co-operation will effectually cut and destroy all surplus plants and leave the standing crop regular and uniform throughout the field, and that it will be very useful in economizing labor.

In operation wheels $a\ a$ will travel over the space chopped out and to be chopped. The space between the outer ends of blades G G and the tread of the wheels $a\ a$ will never be less than the space left between the inner ends of said blades G G.

What I claim, and desire to secure by Letters Patent of the United States, is—

1. In a cotton-chopping machine, the combination of longitudinally-vibrating blades G G, stocks H, cross-beam L, cross-bar J, shaft or rod K, with pitman M, eccentric-wheel N, and pinion F, substantially as described.

2. In cotton-chopping machines, the combination of blades G G, stock H, shaft or rod K, pitman M, and eccentric-wheel N, as substantially set forth and described.

In testimony whereof I affix my signature in presence of two witnesses.

BURWELL J. CURRY.

Witnesses:
JOSEPH F. ELLIS,
N. P. TAYLOR.